United States Patent Office 3,341,440
Patented Sept. 12, 1967

3,341,440
PHOTOCHEMICAL PROCESS FOR THE PREPARATION OF DECACHLOROBUTANE
Samuel Gelfand, Niagara Falls, N.Y., assignor to Hooker Chemical Corporation, Niagara Falls, N.Y., a corporation of New York
No Drawing. Filed Feb. 10, 1964, Ser. No. 343,452
9 Claims. (Cl. 204—163)

ABSTRACT OF THE DISCLOSURE

A process for the preparation of decachlorobutane is provided. In said process, hexachlorobutadiene and liquid chlorine are reacted in the presence of actinic light at a temperature of from about −40 degrees centigrade to about 10 degrees centigrade. Via said process almost stoichiometric yields of decachlorobutane are obtained.

---

This invention relates to the chlorination of hexachlorobutadiene, and more particularly it relates to an improved process for the preparation of decachlorobutane by the chlorination of hexachlorobutadiene.

It is known that hexachlorobutadiene can be chlorinated to produce decachlorobutane. However, all the prior art processes give poor yields of the decachlorobutane. Normally, by-products such as hexachloroethane are produced in substantial amounts along with the decachlorobutane, thereby reducing the yield of decachlorobutane, making it useless for some applications, and thereby making the prior art process unsuitable for commercialization. In addition to hexachloroethane, other chlorinolysis products are produced by the prior art processes making such processes cumbersome and difficult to obtain decachlorobutane in high yield and purity.

It is an object of this invention to provide an improved process for the manufacture of decachlorobutane.

Another object of the present invention is to provide a process for the reaction of hexachlorobutadiene with chlorine to produce decachlorobutane in high yields without the production of excessive amounts of chlorinolysis products.

These and other objects will become apparent from a reading of the specification hereinafter.

In accordance with the present invention, hexachlorobutadiene and liquid chlorine are reacted together at a temperature of from −40 degrees centigrade to about 10 degrees centigrade in the presence of actinic light. The reaction occurring can be illustrated by the following equation, which is not intended to be limiting:

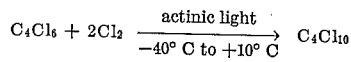
$$C_4Cl_6 + 2Cl_2 \xrightarrow[-40^\circ \text{ C to } +10^\circ \text{ C}]{\text{actinic light}} C_4Cl_{10}$$

Chlorination is normally continued until the addition of chlorine is complete, as evidenced by analysis of the product.

The reaction is generally accomplished by irradiating mixtures of the reactants at the desired reaction temperature until the desired chlorine content has been achieved. Reaction temperatures are generally in the range of from −40 degrees centigrade to about +10 degrees centigrade, with a preferred range being from −10 degrees centigrade to +5 degrees centigrade.

The reactants generally employed in the reaction are in the range from about the theoretical amount of chlorine, 2 moles of chlorine per mole of hexachlorobutadiene, to an excess of chlorine, about 8 moles of chlorine per mole of hexachlorobutadiene, with the preferred ratio being two moles of chlorine to one mole of hexachlorobutadiene to 5 to 1.

Reaction times will vary and depend, for example, on the molar ratio of the reactants being utilized and the temperature being employed. Generally, the reaction is accomplished in from about 0 to about 50 hours, with a preferred time being from 15 to about 30 hours. Other reaction times are also effective, i.e., less than 10 hours or more than 50 hours.

A solvent is generally not necesary, but one, such as halogenated hydrocarbons like carbon tetrachloride, can be used to moderate or facilitate the reaction. When an excess of chlorine is used in the reaction, it can also serve as a solvent. Other solvents which desirably maintain the reaction mixture liquid at the reaction temperature and which do not react with either of the selected starting reagents may also be utilized.

Actinic light is employed for promoting the chlorination reaction. Any of the well known light sources which will accelerate the chlorination of hexachlorobutadiene may be used, such as tungsten filament lamps, ultraviolet lamps, mercury vapor arc lamps, fluorescent lamps, ordinary light bulbs, and the like.

In practicing the process of this invention, yields of greater than 90 percent of decachlorobutane of greater than 90 percent purity are obtainable. The by-products admixed with the decachlorobutane product are separated by any convenient method known in this art, such as distillation. If desired, any octachlorobutane by-product produced from incomplete chlorination can be distilled off and recovered for recycle.

The hexachlorobutadiene starting reagent is prepared by any method known in the art such as, for example, by chlorinating butane at a temperature in the range of 75 degrees centigrade to 100 degrees centigrade, followed by the reaction of 2 moles of chlorine at a temperature from 300 degrees centigrade to 400 degrees centigrade.

The product produced by the invented process, decachlorobutane, finds utility as a vulcanizing agent for ethylene propylene rubber, as will be more fully demonstrated in the working examples.

In order that the invention may be more fully understood, the following examples are given by way if illustrations, but the invention is not limited thereto.

In the specification, examples, and claims, parts are by weight and degrees are in degrees centigrade, unless otherwise indicated.

Example 1

A mixture of 48 grams (0.183 mole) of hexachlorobutadiene and 52 grams (0.73 mole) of chlorine was charged to a Carius tube and the tube was sealed. The tube was immersed in a circulating methanol-water bath maintained at 0 to minus 5 degrees centigrade. An ultraviolet lamp contained in an air cooled Pyrex well was immersed in the cooling bath and the Carius tube was irradiated for 15 hours. After cooling in a Dry Ice-acetone bath, the tube was opened and most of the excess chlorine was removed by evaporation as the tube warmed to room temperature. The last traces of chlorine were removed by purging the product at steam bath temperatures (about 100 degrees centigrade) with a stream of air.

The actual yield of product was 74 grams, which is the theoretical yield of decachlorobutane. Analysis by infrared means indicated the product to be of 91 percent purity.

Example 2

In a manner similar to that of Example 1, a mixture of hexachlorobutadiene 18 grams (0.07 mole) and chlorine 24 grams (0.34 mole) was irradiated at 0 to plus 5 degrees centigrade for 30 hours. The yield of crude product was 28 grams. (Theoretical for $C_4Cl_{10}$ 28.2 grams) Infrared analysis revealed a 94 percent purity.

Examples 3–6

In a manner similar to that of Example 1, the following reactions are effected and products result.

| Example Number | Time in Hours | Mole Ratio, Chlorine to Hexachlorobutadiene | Percent Excess Chlorine | Temp., °C | Percent $C_4Cl_{10}$ | Percent $C_2Cl_6$ |
|---|---|---|---|---|---|---|
| 3 | 30 | 5:1 | 150 | 0 to 5 | 94 | 7.5 |
| 4 | 15 | 4:1 | 100 | 0 to −5 | 91 | 7.8 |
| 5 | 15 | 8:1 | 300 | 0 to −5 | 93 | 5.8 |
| 6 | 20 | 2:1 | 0 | 0 to +5 | 92 | 6.4 |

*Example 7 (comparative)*

In a manner analogous to Example 1, a mixture of 26 grams (0.1 mole) of hexachlorobutadiene and 21 grams (0.3 mole) of liquid chlorine was irradiated at 28 to 30 degrees centigrade for a period of 23 hours.

Analysis of the product gave the following results:

Percent decachlorobutane ---------------------- 65
Percent hexachloroethane ---------------------- 33

It is found that when the reaction is conducted at temperatures above 10 degrees centigrade, the percentage of undesirable by-products increases, usually being over 10 percent.

*Example 8*

This example illustrates the excess amounts of cleavage products in the absence of liquid chlorine.

A mixture of carbon tetrachloride, 260 grams, and hexachlorobutadiene was charged to a flask illuminated by a 200 watt unjacketed ultraviolet lamp contained in a quartz well line. The temperature was maintained at 0° C. ±2° C. and a total of 215 grams of chlorine was bubbled through over a 14 hour period. The carbon tetrachloride was distilled off and the product analyzed by infrared. In addition to unreacted hexachlorobutadiene as the major product the analysis was the following.

|   | Percent |
|---|---|
| Hexachloroethane | 4.8 |
| Octachlorobutene | 15 |
| Decachlorobutane (max.) | 1.3 |

Hexachloroethane represented 22.7 percent of the product.

*Example 9*

Several typical rubber formulations were prepared by blending together the following substances, with a chlorocarbon.

|   | Parts |
|---|---|
| Ethylene-propylene rubber [1] | 100 |
| HAF carbon [2] | 50 |
| Sulfur | 1 |
| Ferric oxide | 5 |
| Tall oil | 5 |
| Chlorocarbon | 5 |

[1] Enjay EPR 404.
[2] High abrasion furnace carbon black.

These formulations were cured in a press mold for 40 minutes at 160 degrees centigrade. The following results were obtained:

| Chlorocarbon | 300% Modulus, p.s.i.[1] | Tensile Strength, p.s.i.[1] | Elongation, percent |
|---|---|---|---|
| Octachlorocyclopentene | 1,196 | 2,026 | 502 |
| Decachlorobutane | 1,703 | 2,157 | 382 |
| Octachloropropane |  | 2,260 | 517 |

[1] Pounds per square inch.

Improvement in "state" of cure with $C_4Cl_{10}$ is shown by the increase in 300 percent modulus (tensile strength at 300 percent elongation) and decrease in elongation at break.

The physical test data obtained in accordance with American Society for Testing Materials (ASTM), ASTM D-412-511T.

It is apparent that different embodiments of this invention may be made without departing from the spirit and scope thereof. The invention is not to be limited except as in the appended claims.

What is claimed is:

1. A process for the preparation of decachlorobutane which comprises reacting hexachlorobutadiene with liquid chlorine at a temperature of from −40 degrees centigrade to about 10 degrees centigrade in the presence of actinic light.

2. A process in accordance with claim 1 wherein the temperature is from −10 degrees centigrade to about 5 degrees centigrade.

3. A process in accordance with claim 1 wherein ultraviolet light is employed.

4. A process in accordance with claim 1 wherein the molar ratio of reactants employed is in the range of 1 mole of hexachlorobutadiene to 2 moles of chlorine to 1 mole of hexachlorobutadiene to 8 moles of chlorine.

5. A process for the preparation of decachlorobutane which comprises reacting hexachlorobutadiene with liquid chlorine at a temperature from about −5 degrees centigrade to 5 degrees centigrade in the presence of ultraviolet light followed by isolation of the desired product.

6. A process for the preparation of decachlorobutane in greater than 90 percent yield which comprises reacting about 4 moles of liquid chlorine with 1 mole of hexachlorobutadiene at a temperature of from 0 to 5 degrees centigrade, and in the presence of ultraviolet light for a period of about 15 hours, followed by isolation of the desired product.

7. An integrated process for the preparation of decachlorobutane which comprises:
 (a) reacting hexachlorobutadiene with liquid chlorine at a temperature of from about −40 degrees centigrade to about 10 degrees centigrade in the presence of actinic light;
 (b) isolating the desired product;
 (c) recovering the by-products; and
 (d) recycling recovered octachlorobutene by-product to the hexachlorobutadiene-liquid chlorine reaction mixture.

8. A process in accordance with claim 7 wherein the temperature is from −10 degrees centigrade to about 5 degrees centigrade.

9. A process in accordance with claim 7 wherein ultraviolet light is employed.

References Cited

A. Roedig: Annalen, 574 (1951), pages 122–130.

A. Weissberger: Technique of Organic Chemistry, vol. II (1956), second edition, pages 360–363.

HOWARD S. WILLIAMS, *Primary Examiner.*